United States Patent
Karthikeyan et al.

(10) Patent No.: US 10,284,920 B2
(45) Date of Patent: *May 7, 2019

(54) CONTENT DISTRIBUTION SYSTEM AND METHOD BASED ON INFORMATION RELATING TO DESTINATION CAPABILITY AND NETWORK CONDITIONS

(71) Applicant: BRITISH TELECOMMUNICATIONS public limited company, London (GB)

(72) Inventors: Vidhyalakshmi Karthikeyan, London (GB); Detlef Nauck, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/392,238

(22) PCT Filed: Jun. 25, 2014

(86) PCT No.: PCT/GB2014/000256
§ 371 (c)(1),
(2) Date: Dec. 24, 2015

(87) PCT Pub. No.: WO2014/207425
PCT Pub. Date: Dec. 31, 2014

(65) Prior Publication Data
US 2016/0142789 A1    May 19, 2016

(30) Foreign Application Priority Data
Jun. 25, 2013   (EP) .................................. 13250080

(51) Int. Cl.
H04N 21/6405   (2011.01)
H04N 21/24     (2011.01)
(Continued)

(52) U.S. Cl.
CPC ..... *H04N 21/6405* (2013.01); *H04N 21/2393* (2013.01); *H04N 21/2402* (2013.01);
(Continued)

(58) Field of Classification Search
None
See application file for complete search history.

(56) References Cited

U.S. PATENT DOCUMENTS 6,211,901 B1    4/2001   Imajima
6,826,612 B1    11/2004  Bosloy
(Continued)

FOREIGN PATENT DOCUMENTS

CN    101248666    8/2008
CN    102137277    7/2011
(Continued)

OTHER PUBLICATIONS

International Search Report for PCT/GB2014/000256 dated Aug. 18, 2014, three pages.
(Continued)

*Primary Examiner* — Hoang Vu A Nguyen Ba
(74) *Attorney, Agent, or Firm* — Nixon & Vanderhye PC (57) ABSTRACT

There are described methods and systems for distributing content in a network, in particular a multicast network. One method includes delivering content from a source to a destination in a content delivery network. A request for an item of content is received and a first multicast stream is identified or established, the first multicast stream comprising a first copy of the content. At least one second multicast stream is also identified or established, the second stream comprising a second copy of the content. The second copy of the content is time-shifted by a time, M, from correspond-
(Continued)

ing portions of the first copy of the content. The content is then delivered to the destination using both the first and the second multicast streams.

14 Claims, 5 Drawing Sheets (51) Int. Cl.
*H04N 21/239* (2011.01)
*H04N 21/258* (2011.01)
*H04N 21/262* (2011.01)
*H04N 21/472* (2011.01)

(52) U.S. Cl.
CPC . *H04N 21/25808* (2013.01); *H04N 21/25841* (2013.01); *H04N 21/26283* (2013.01); *H04N 21/47208* (2013.01)

(56) References Cited

U.S. PATENT DOCUMENTS

| | | | |
|---|---|---|---|
| 6,970,940 | B1 | 11/2005 | Vogel |
| 7,260,640 | B1 | 8/2007 | Kramer |
| 7,698,724 | B1 | 4/2010 | Day |
| 7,760,659 | B2 | 7/2010 | Luo |
| 8,370,507 | B1 | 2/2013 | Cain |
| 8,386,629 | B2 | 2/2013 | Tan |
| 9,674,245 | B2 | 6/2017 | Karthikeyan et al. |
| 10,084,883 | B2 | 9/2018 | Karthikeyan et al. |
| 2002/0114330 | A1 | 8/2002 | Cheung et al. |
| 2003/0037331 | A1 | 2/2003 | Lee |
| 2003/0074667 | A1 | 4/2003 | Cheung et al. |
| 2003/0093543 | A1 | 5/2003 | Cheung et al. |
| 2005/0015404 | A1 | 1/2005 | Cherkasova |
| 2006/0015637 | A1 | 1/2006 | Chung |
| 2006/0029093 | A1* | 2/2006 | Van Rossum ..... G06F 17/30017 370/432 |
| 2006/0200574 | A1 | 9/2006 | Pickens |
| 2006/0200576 | A1 | 9/2006 | Pickens |
| 2008/0077701 | A1* | 3/2008 | Kongalath ............. H04L 12/18 709/232 |
| 2008/0107110 | A1 | 5/2008 | Andou |
| 2008/0109857 | A1 | 5/2008 | Goodwill |
| 2009/0055880 | A1 | 2/2009 | Batteram et al. |
| 2009/0187673 | A1* | 7/2009 | Ramjee ............... H04L 67/2828 709/247 |
| 2009/0265743 | A1 | 10/2009 | Gao |
| 2009/0319845 | A1 | 12/2009 | Liu |
| 2009/0327842 | A1 | 12/2009 | Liu |
| 2010/0106851 | A1 | 4/2010 | Aoki |
| 2010/0287238 | A1 | 11/2010 | Setton |
| 2010/0313228 | A1 | 12/2010 | Morrissey |
| 2011/0179328 | A1 | 7/2011 | Souza |
| 2012/0042350 | A1 | 2/2012 | Ramakrishnan |
| 2012/0222063 | A1* | 8/2012 | Mao ................... H04N 7/17318 725/31 |
| 2013/0031210 | A1 | 1/2013 | Redmond |
| 2016/0134944 | A1 | 5/2016 | Karthikeyan et al. |
| 2016/0149980 | A1 | 5/2016 | Karthikeyan et al. |

FOREIGN PATENT DOCUMENTS

| | | |
|---|---|---|
| EP | 0 749 241 | 12/1996 |
| EP | 1 814 269 | 8/2007 |
| EP | 2 536 163 | 12/2012 |
| JP | 2007-208953 | 8/2007 |
| WO | 01/50765 | 7/2001 |
| WO | WO 2007/024233 | 3/2007 |
| WO | 2007/068290 | 6/2007 |

OTHER PUBLICATIONS

First Office Action dated Mar. 16, 2018 in Chinese Application No. 201480036517.4 (with English translation), 14 pages.
Search Report dated Feb. 8, 2018 in Chinese Application No. 201480036517.4 (with English translation), 4 pages.
International Search Report dated Aug. 21, 2014 issued in PCT/GB2014/000258 (2 pages).
International Search Report dated Jul. 30, 2014 issued in PCT/GB2014/000255 (3 pages).
International Search Report dated Aug. 21, 2014 issued in PCT/GB2014/000257, (3 pages).
International Search Report dated May 15, 2014 issued in PCT/GB2014/000124 (2 pages).

* cited by examiner

CONTENT DISTRIBUTION SYSTEM AND METHOD BASED ON INFORMATION RELATING TO DESTINATION CAPABILITY AND NETWORK CONDITIONS

This application is the U.S. national phase of International Application No. PCT/GB2014/000256 filed 25 Jun. 2014 which designated the U.S. and claims priority to EP Patent Application No. 13250080.2 filed 25 Jun. 2013, the entire contents of each of which are hereby incorporated by reference.

BACKGROUND AND SUMMARY

The system relates to the distribution of content in a network, in particular embodiments, the distribution of on demand content in a multicast network.

Delivery of significant volumes of data to multiple users, or end hosts, can impose a significant burden on a network. Data can be broadcast over the network and picked up by receivers interested in obtaining the data. However, there may be whole sections of a network in which there is no receiver who wishes to obtain the data so broadcasting data to these network portions wastes network bandwidth. An alternative approach is to send data directly to only those users who have requested the data using unicast methods. However, this can result in large amounts of replicated content being transmitted over the network, which again can cause congestion in the network and affect reliability and Quality of Service (QoS) for other data being transmitted in the network.

Multicasting techniques can be used to distribute content more efficiently in a network by ensuring that content is not replicated in the network until paths to its intended destinations split in the network topology.

The delivery of on-demand content poses a particular problem, however, since multiple users may request the same content at different times and each user may wish to pause or rewind the content stream during playback of the media. Delivery of such on-demand content by unicast enables a user to start viewing a stream at any time and to pause and rewind the stream. However, unicasting of all content is undesirable in most networks since it results in significant replication of the content transmitted over the network and consumes large amounts of network bandwidth.

There are difficulties in using multicast delivery techniques to deliver on-demand content to several end hosts; for example, the multicast stream cannot be paused or rewound for a single user wishing to join the stream at a later stage, as might be the case in uptake of on-demand content. This might result in the new host having to set up and receive a unicast stream for the content, no matter how little ahead in time the multicast stream might be from the start of the piece of content.

In a further aspect, there is provided a method of delivering content from a source to at least one destination in a content delivery network, the method comprising:
  receiving a request for delivery of a piece of content to the destination;
  receiving information relating to a capability of the destination;
  determining whether the content should be delivered in a multiple multicast time-shifted content delivery mode, the mode comprising delivering the piece of content using a plurality of multicast streams, the plurality of multicast streams each delivering the content with a relative time-shift between corresponding portions of the content;
  wherein the determination is based on at least one of:
    a measure of the number of requests for the content in a preceding time period;
    a model of predicted requests for the content in a subsequent time period;
    a determination of the geographical or topological distribution of the existing or expected destinations in the network;
    the topological or geographical position of the requesting destination in the content delivery network compared to the position of other destinations already receiving the content; and
    a measure of the network capacity or availability between the source and the at least one destination.

The method can enable a system to determine whether content should be delivered using multiple time-shifted multicast streams based on a number of factors, or optionally based on a combination of such factors. The analysis of these factors can enable the system to ensure content is delivered efficiently, but in accordance with current network conditions and capabilities.

The information relating to the capability of the destination may comprise an indication of whether the destination is able to receive multiple multicast streams. In some embodiments, the capability of the destination comprises the buffer capacity of the destination and/or a determination of the number of streams that can be simultaneously received by the destination. The capabilities of the destination may be used to govern whether and how many multiple multicast streams are used for content delivery.

In one embodiment, the at least one destination comprises a plurality of destinations and the capability comprises the buffer capacity of the destination having the smallest buffer capacity, the mean buffer capacity of the destinations or the modal buffer capacity of the destinations.

Optionally, the model of predicted requests determines the expected number of requests or expected rate of requests for the content over a subsequent time period. For example, the model may predict the number of requests for the content that are expected within the hour after the content is first made available or the expected rate of fall-off of requests after a peak.

Optionally, the model of predicted requests determines the expected geographical or topological distribution of requesting destinations over a subsequent time period.

In a particular embodiment, the content is delivered using a plurality of time-delayed multicast streams if the destination requesting the content is capable of receiving a plurality of time-delayed multicast streams and at least one, optionally both, of the following conditions is fulfilled:
  the model predicts at least one further request for the content in a predetermined period;
  the content is being delivered to a least one other destination that is topologically or geographically proximate to the requesting destination.

A number of aspects of embodiments of the system have been described above. It will be clear to one skilled in the art that each of these aspects may be implemented independently. However, the aspects are optionally implemented in conjunction with each other to provide multiple advantages as part of a larger system. Features of one aspect may be applied directly to other aspects of the system. Further, method features may be applied directly to aspects of the apparatus.

In particular, in all of the aspects described above, the destination may be a host or a host designated router, H-DR, in a multicast network. The host may be the end user terminal associated with an end user or consumer of the content or may be an intermediate device that serves the content to the user's device. For example, the destination may be a hub within a home network that receives the content for streaming to a user's terminal, such as an internet-connected television, a computer, a tablet or a telephone.

Similarly, in all of the aspects described above, the source may be the device that serves the content in the network or may be an intelligent routing component in the network that handles routing of content to destinations. The content may pass through the intelligent routing component, or the component may control other components in the network, such as the source, to implement the methods described herein.

Further, in all of the aspects set out above, the content is optionally video content and/or audio content, in particular on-demand content delivered in response to a request from a user. However, the skilled person will appreciate that the systems and methods described herein could equally be applied to networks for the distribution of data, such as text or image data, or software.

BRIEF DESCRIPTION OF THE DRAWINGS

Embodiments of the system will now be described in more detail with references to the accompanying figures in which.

DETAILED DESCRIPTION OF PRESENT EXAMPLE EMBODIMENTS

As set out above, aspects of the system described herein create multiple time-staggered multicast streams for the same piece of content. In some embodiments, the source uses intelligent data analytics to decide which hosts should subscribe to which of those (one or more) multicast streams. The source can then trigger subscription of the hosts to the chosen streams. The hosts re-assemble the multiple streams which provide data from different starting points, and leave multicast trees once they no longer receive unreplicated content from that tree. This affects host-to-group membership and also results in better use of network resources by minimising the number of unicast streams in the network for a piece of content. Embodiments of each of the elements set out above are now described in more detail, but an embodiment of a network in which the present system may be implemented is first described.

In the following description, the following terms may be used and take the normal meanings of which a skilled person in this technical area would be aware. In particular:

Host: an end user or destination that requests some content from a source that can be delivered by unicast or multicast.

Source: provider of some content that either sends to hosts via unicast or pushes it into the network via multicast Content: electronic media, including but not limited to video files/streams, linear TV, audio files/streams (conference, radio, podcast), large file downloads etc.

DR: Designated router.

Figure 1:
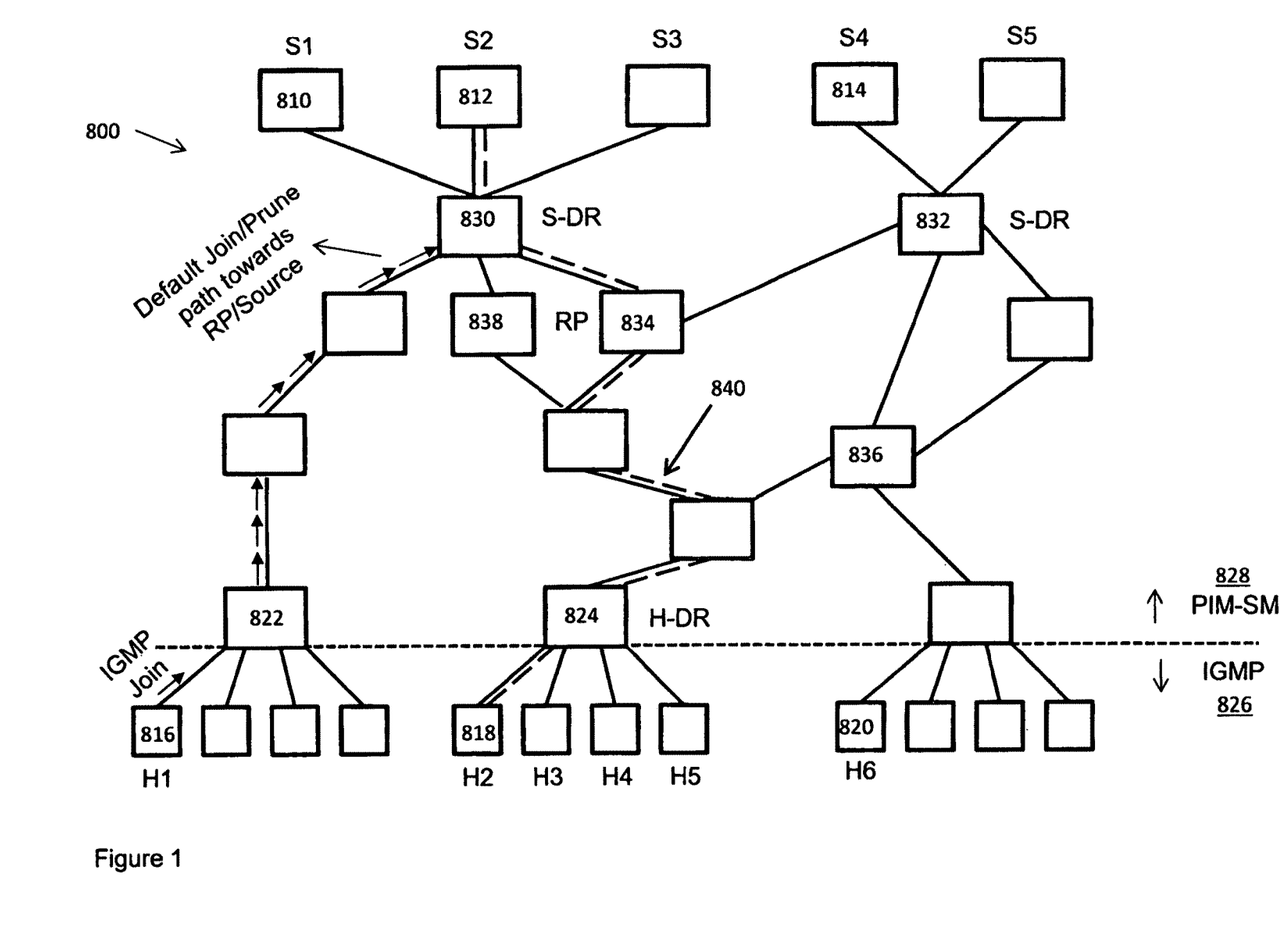
FIG. 1 is a schematic diagram of an example network within which aspects of the present system may be implemented.

A network 800 within which aspects of the present system may be implemented is illustrated schematically in FIG. 1. Multicast networks can be used to deliver content, such as video on demand content from one of a plurality of content servers, or sources 810, 812, 814, to each of a plurality of destinations or hosts 816, 818, 820. Multicast networks can be notionally divided into two sections, one of which 826 comprises the hosts and the adjacent routers 822, 824, which communicate using protocols such as the Internet Group Management Protocol (IGMP) to establish and manage the multicast group memberships of the hosts. In an IPv6 network, this section of the network operates using Multicast Listener Discovery (MLD) and ICMPv6 (Internet Control Message Protocol) messaging and references to IGMP and other IPv4 protocols herein are intended to include and encompass equivalent IPv6 protocols.

The other notional section of the multicast network 828 typically uses a protocol such as Protocol Independent Multicast, usually in Sparse Mode (PIM-SM) to route and implement multicast in the rest of the network, from the sources 810, 812, 814 to the routers adjacent the hosts 822, 824. In particular, PIM-SM or similar protocols of which the skilled person will be aware are used to manage the membership of routers to multicast groups, which subscribe to content sources in the network.

FIG. 1 illustrates a multicast network 800 that includes a plurality of sources, 810, 812, 814, each of which is capable of providing or serving content to a host 816, 818, 820 via the network. The sources are connected to source designated routers (S-DRs) 830, 832, which manage the delivery of content from the source to components in the network.

The network also includes a number of intermediate routers, IRs, 836, 838 that carry the multicast streams (along with other network traffic) from the sources 810, 812, 814 to the hosts 816, 818, 820. The IRs may include one or more Rendezvous Points (RPs) 834 for particular multicast streams. The RPs 834 are routers in the network through which multicast data for a particular group passes to all the downstream routers unless the downstream router is in a source-specific mode. That is, downstream routers or hosts 824, 818 join the multicast stream through the RP 834. Therefore, the downstream multicast tree is centred on the RP 834.

The routers closest to the hosts or destinations can be termed host designated routers (H-DR) 822, 824. A multicast stream destined for a particular host 816 passes through the associated H-DR 822 and the host sends to its H-DR requests to join or prune from a particular multicast group using IGMP.

By way of further example, a source 812 multicasting content in a multicast group G, broadcasts advertisement messages for that content throughout the network. Host H2 818 receives the advertisement and wishes to receive the multicast data. The host 818 sends to its H-DR 824 an IGMP Join request specifying the multicast address of the multicast stream that it wishes to join, as detailed in the advertisement message, together with its membership information. The H-DR 824 builds a multicast tree back to the source 812 of the content, usually based on the shortest path through the network back to the S-DR 830 for the content. However, in most operational modes, the multicast tree must pass through the designated RP 834 for that multicast stream, and not through other IRs 838, even if these would provide a shorter path back to the S-DR 830. The H-DR 824 sends periodic Join/Prune messages towards the group-specific RP 834 for each group for which it has active downstream members.

If the multicast tree is already delivering content to other hosts, the H-DR 824 simply builds a branch back to the existing multicast tree. If the host is the first to request the content in that area of the network, the tree may be built back to the S-DR 830. The multicast tree is indicated in FIG. 1 by a dashed line 840. Once the multicast tree has been built, multicast content can be delivered down the tree to the H-DR 824 and from there to the requesting host 818.

In PIM-SM based multicast systems, when a host Designated Router (host-DR) receives a Membership Report from one of its hosts to join a group G, it uses its unicast protocol to look up the address of the neighbour who is the next hop on the shortest path towards the RP (Rendezvous Point Tree, RPT) or the source (Shortest Path Tree, SPT). The same action is performed when an intermediate router receives a Join/Prune message from downstream routers with the same request. They use the unicast protocol's routing metric as the MRIB routing metric, associated with a metric preference that reflects the method through which this cost was learned (i.e. each unicast protocol has an associated metric preference value and metric costs can only be compared if the metric preference value is the same). The next hop neighbour with the lowest cost is chosen as the upstream neighbour, to which a Join/Prune message is sent. A Join/Prune message, as it travels all the way to the RP or source, triggers the creation of a Group-related route entry in each router. This reverse route that is built to the RP or the source is used to route the flow of multicast data packets in the downstream direction from the RP or source to the end host.

Each router on the multicast tree 840 maintains a route entry within an internal database, such as the Multicast Routing Information Base (MRIB), that includes information such as the source address, the group address, the incoming interface at which packets are received and a list of outgoing interfaces to which packets should be sent for onward transmission down the multicast tree. Timers, flag bits and other information may also be stored in the MRIB entry.

To leave a multicast group, G, the host 818 sends a Prune request to the H-DR 824, which then propagates upwards through the multicast tree to tear down that branch of the tree up to the point at which the tree is needed to deliver the multicast data to other hosts.

In a network such as that shown in FIG. 1, a first host, H1, may request a single piece of content at time T. This content is soured by source S, which is connected to a source Designated Router (source-DR or S-DR) in a network that operates PIM-SM or an equivalent multicast routing protocol. The hosts use IGMP or similar for membership management. The content stream itself lasts X minutes and the future time when the session finishes, T+X, may be called T1. The piece of content could be a news item or a movie that has gained popularity and is now being requested by several users, with relatively short time intervals between each request. If a multicast stream is started for the first user, in anticipation of several other users joining in to this group to watch this content, it cannot be stopped or paused for each new host to catch up to the furthest point. This results in multicast not being possible for this scenario. However, there is described herein a method where several time-staggered multicast streams are triggered to disseminate a piece of content to a number of hosts, starting the stream from the first stream position requested (i.e. the beginning) at time T. At a later point in time, each multicast tree will serve a subset of all these hosts but each host member in this group might actually be playing out different points in the stream itself. We call this a 'catch up' capability, provided by the source or its interface into the network such as the source-DR, in the case of PIM-SM. The intelligence may be deployed in the source or its interface and also in the hosts of this group. The source decides on which of the one or more multicast streams a host subscribes to and can communicate this back to the host using the unicast streaming protocol request.

Figure 2:
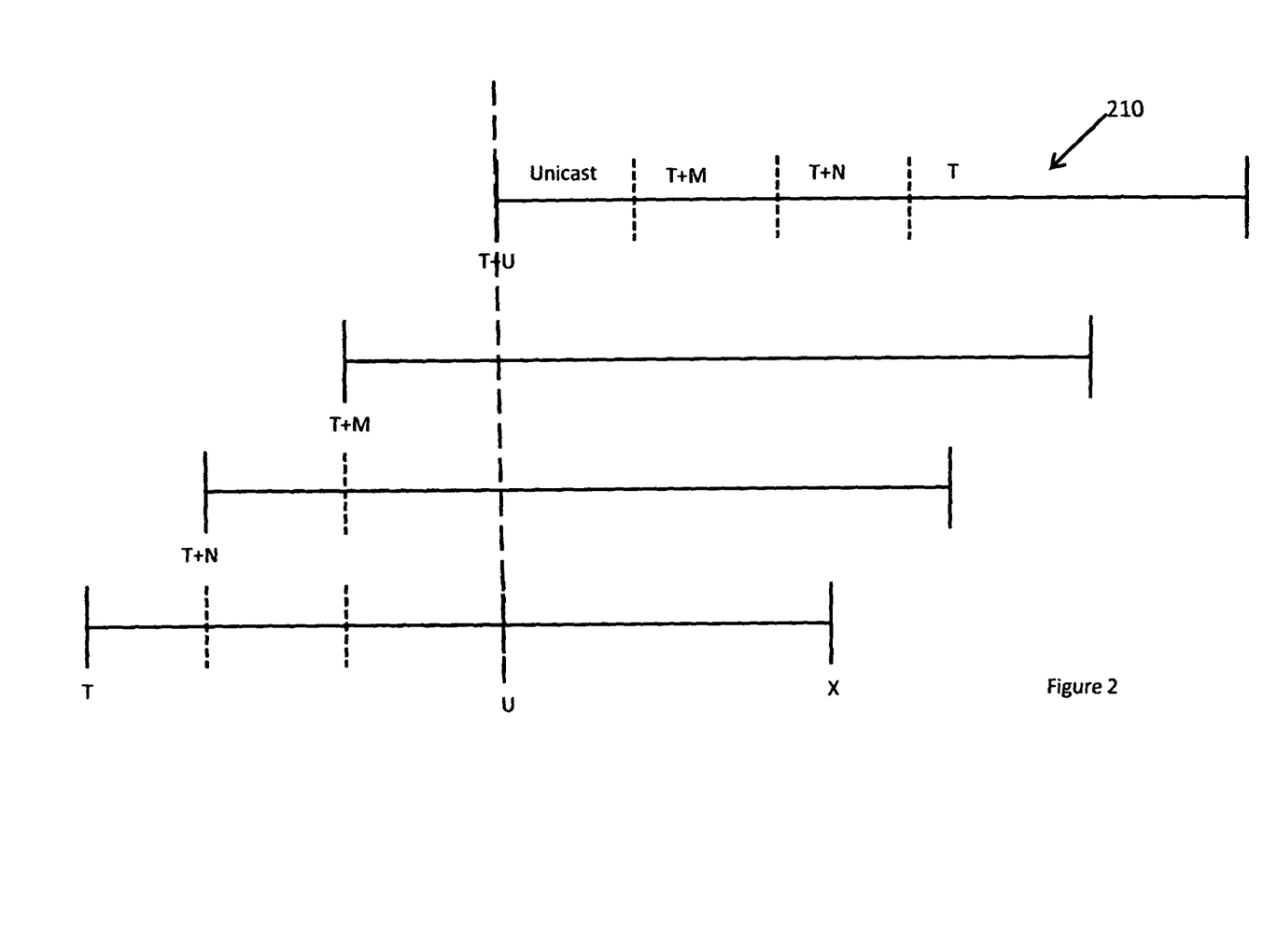
FIG. 2 illustrates schematically multiple time-delayed multicast streams according to one embodiment.

A single host of the present system can receive multiple multicast streams simultaneously on different interfaces, all buffered and re-assembled by the upper layer protocols. Each multicast stream will be simultaneously delivering content from the same stream but from different points in the video, e.g. as illustrated in FIG. 2, one stream could have started from the beginning at time T, the next stream at T+N, and another at T+M (which is later than time T+N). They all start from the beginning of the content and will each last X minutes. A user joins at time T+U, where U>M>N. The source requests that this host subscribes to all streams S(T), S(T+N) and S(T+M) and this membership is successful. The host now starts receiving three streams concurrently on different interfaces, which it begins to buffer.

The stream that started at T, stream S(T), will be the furthest through the video, with the one that started at T+N, stream S(T+N), behind by N minutes and the last stream, S(T+M), behind by M minutes from T. This means that the host can buffer this content as it receives it and prune off from the streams that eventually deliver or output the content that has already been delivered by another stream. For example, after receiving stream S(T+N) for N minutes, this stream will begin to deliver packets that were already received N minutes ago at the start of S(T). Similarly, after time M−N, stream S(T+M) will start to deliver packets that were already received (M−N) minutes and M minutes ago from S(T+N) and S(T) respectively. This means that at time T+N, the host can leave the group that delivers stream S(T+M) and at time T+M, the host can leave the group that delivers stream S(T+N). The multicast stream that started the most recently in time, in this case at T+M, is the one that is pruned off first because the preceding stream would have already delivered the relevant packets at its start. However, there still remains a duration (U−M) from the start of the content that will not be delivered by any of the existing multicast streams S(T), S(T+N) or S(T+M) because they all started from the beginning before time T+U. S(T+M), the stream closest to the start of the video, will be (U−M) minutes from the start of the show. Therefore, the packets that correspond from the start of the video to (U−M) minutes into the stream are sent by unicast to the host, since they are not available on any other multicast stream.

In FIG. 2, stream 210 is the stream that is output to the user at the host. Above this stream is provided an indication of the source stream from which each particular portion of the content was obtained. However, the skilled person will appreciate that the content is output seamlessly to the user without any break or noticeable change when the source of the content changes from one stream to another.

Figure 3:
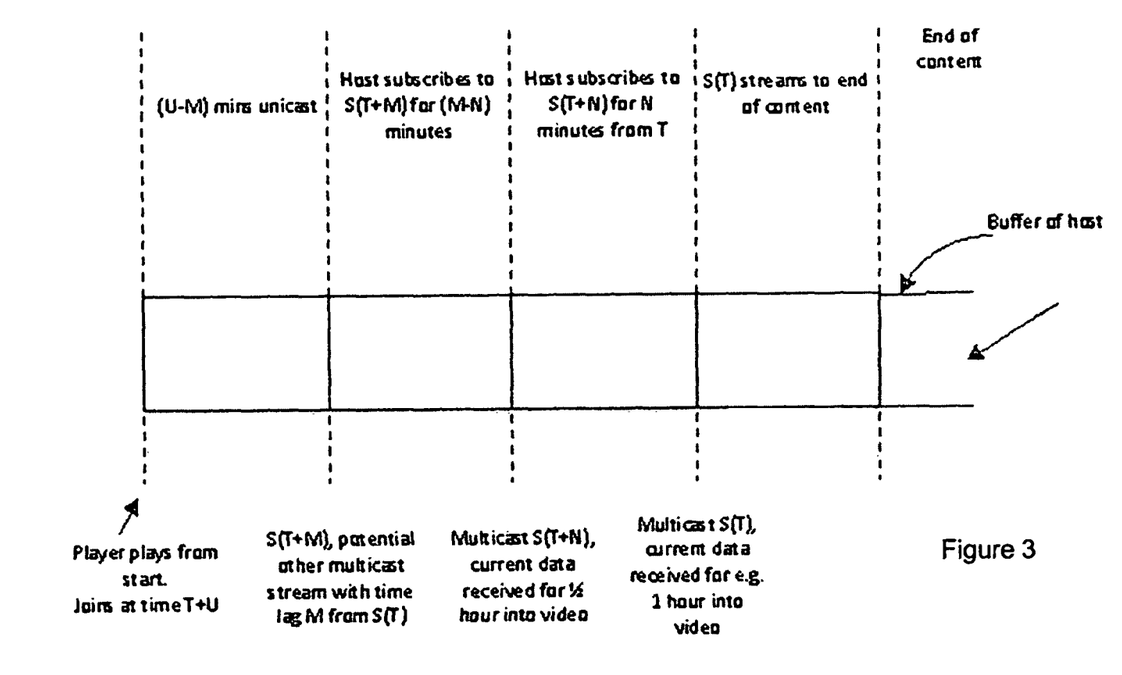
FIG. 3 is a schematic diagram of a multicast stream buffered at a receiving host according to one embodiment.

FIG. 3 is a schematic illustration of a stream that is buffered for output by the receiving host. Sections A1, A2, A3 and A4 are each received from different streams when the user requests the content. A request for the content is received from the host at time U. Section A1, which is of time length U-M is unicast to the host, since all of the multicast streams have already passed this point in the content when the request is received. Section A2, which is of length M-N is received from stream S(T+M) at the same time as the host is receiving the unicast section A1. Section A2 is therefore buffered by the host until A1 has finished being played to the user and A2 is then output to the user. Section A3, which is of length T-N minutes is received from stream S(T+N) simultaneously with the receipt of Sections A1 and A2. Section A3 is therefore also buffered for output until A1 and A2 have been output. The beginning of Section A4 is received from multicast stream S(T) substantially simultaneously with Sections A1, A2 and A3. Section A4 is received and buffered and is output to the user after Sections A1, A2 and A3. However, since there are no more multicast streams in this example, the host will continue to receive stream S(T) and will continue to output Section A4 until it reaches the end of the content.

It will be clear to one skilled in the art that the example given above may be modified and varied depending on the requirements and capabilities of the system and based on some of the criteria and technical considerations set out below. For example, each host may be capable of receiving and buffering more or fewer than 4 streams or the network may limit the number of available streams for a single piece of content to fewer than 4.

Implementations of the present system may include some or all of the following features: firstly, the end host should be arranged to buffer the required number of packets, in this case up to M minutes into the stream; secondly, a communication mechanism may be provided between the source and hosts; thirdly, the source can be arranged to govern when to trigger a new multicast stream for the same piece of content; fourthly, the source can be arranged to determine how many and to which multicast streams a host must subscribe, which may be implemented using predictive data analytics capabilities and may take into account data delivery capacity to the host (whether there is a link that supports four streams of content simultaneously (3 from multicast, 1 from unicast) or whether the user is willing to wait for the time it takes to deliver these packets); and fifthly, the end host can be arranged to control when to prune off a given multicast tree as described above. Each of these elements may be provided independently and each is described separately herein. However, the elements may be implemented in conjunction with each other to provide multicast systems and methods as also described herein.

The source and host may implement a protocol for communication. The Real Time Streaming Protocol, RTSP, HyperText Transport Protocol, HTTP, or similar can be used for this purpose. When a host sends a request for a given Uniform Resource Identifier, URI, in an RTSP Setup message, the source or its proxy/interface into the network can respond with a Redirect to issue the new URI of a multicast stream. Alternatively, a source can use combinations of Set_Parameter, Get_Parameter or Announce to publish this change from the media server to the host during the session to trigger the host to migrate to another group. In HTTP, the communication of an alternate multicast URI can be passed from the media server to the host in a URI redirection method using an HTTP refresh header. Similar methods can be devised for other protocol stacks. Alternatively, an external entity can be deployed that performs all the above tasks and communicates actions to both the source and host. This is another embodiment of the same technique using a central rather than distributed intelligence entity.

It is also possible for the intelligence to be deployed not on the media server (i.e. data source) but close to it instead. Such an embodiment may be implemented where the media server is inaccessible (e.g. controlled by a content provider), in which case the network operator can deploy an interface into the source which handles the tasks described herein and acts as a proxy with this extended capability to the source. In the case of PIM-SM, this could be the router that is the first hop of the source, i.e. the source-DR. For ease of reference henceforth, we will assume that the intelligence on the source-end is deployed at the source itself. These variations are encompassed within the claims.

Methods for triggering multiple time-staggered streams are now described. As set out below, there are a number of options for how and when such multicast streams should be triggered. In the methods described below, several multicast streams are created for the same piece of on-demand content so that if a large host group is to request this content at different times, different subsets of this host group can be requested to subscribe to one or more multicast streams, depending on their capability and predicted network performance. The individual variations that cannot be covered by multicast can then be unicast to the hosts as described above, depending on their capabilities.

Since every multicast stream is essentially a time-staggered replication of content in the network, one does not wish to generate streams when this can be avoided. Therefore, the decision of when to trigger a new multicast stream can be made selectively with some intelligence. The methods below, although described independently, may be implemented in the same system at different times or may be implemented in conjunction with each other, so for example a stream may be generated each N minutes according to the first described method if a stream has not already been triggered by the algorithm implementing the second method.

A first possible method is to trigger a multicast stream at regular intervals, every N minutes. This is periodic and may not be adaptive.

In a second method, streams are triggered taking into account the capabilities of the requesting hosts. Between each interval, Interval(M), the host group is subject to change as hosts join and leave the group. This means that if each host subscribes to one or more parallel but time-staggered streams, the interval can be chosen such that the majority of the hosts can buffer the packets required for that period.

For example, from the distribution of host groups at a given evaluation period, 90% of the hosts might be able to hold 2 hours of content in total. If most of the hosts are subscribed to 3 parallel time-staggered multicast streams, then the interval between the 3 streams must be chosen such that by the end of the first 2 hours, data from the oldest stream is not dropped due to buffer overflow. The algorithm could also take into account the rate of consumption of packets by the media player in addition to the number of streams to which a host subscribes and the buffer capacity of the host for this data rate (maximum time of play-out that can be buffered). If a host can only buffer 2 hours of content in total, assuming that this host subscribes to each stream that has been generated till it joins, the periodicity of the streams must be such that in 2 hours, all the streams have not delivered more data than can be consumed by the player. If the interval between streams is too large, the buffer capacity of the host will not be enough to subscribe to a stream and buffer all the received content to play out at a later time after the unicast stream that provides the catch-up to the multicast stream has been played out first. Later packets in the multicast stream will be dropped, which means that gaps exist in play-out and must either be filled with poor play-out quality or re-requesting the dropped chunks of data. This has been explained for a single host—the overall Interval(M) for a given piece of content can be derived from the distribution of all the hosts in the group and choosing an interval such that most of the hosts can benefit from the multiple streams.

In a third method, new streams can also be generated based on predicted uptake patterns. For example, if the operator knows that most consumers watch the content in the evenings (e.g. a movie), then it might be sufficient to not trigger streams during the day because uptake will be minimal.

Another example of predictive triggering of multicast streams is as follows. If the source monitors that 11 hosts out of a small network of 20 have requested for a piece of content in the preceding time period, say 15 minutes, for content that lasts for two hours, it can trigger a multicast stream that starts from the beginning at the time of joining of the $12^{th}$ host, based on a prediction that more hosts in this network might also request the same data. The method is predictive and does not act to consolidate existing unicast streams but instead minimises the number of future unicast streams into a single multicast stream with catch up.

A fourth method is applied from a consolidation of existing multiple closely-spaced unicast streams into a single multicast stream with catch-up for the individual hosts. Alternatively, multicast streams can be triggered retrospectively, to play out from a previous point in time. In the example from Method 3, a multicast stream that starts at the furthest point into the stream is created i.e. at 15 minutes, which is where the first host will be in the stream, to run all the way to the end and the catch-up protocol is triggered for the remaining hosts. The result of this is that after a maximum of 15 minutes, all unicast catch-up will be complete, replication of the data through 10 unnecessary unicast streams has been avoided and all of the first 11 hosts will be playing out content stored in the buffer, received from the start of the multicast stream. This is explained further in FIG. 4 which illustrates four hosts, H1, H2, H3 and H4 each receiving the same content.

Figure 4:
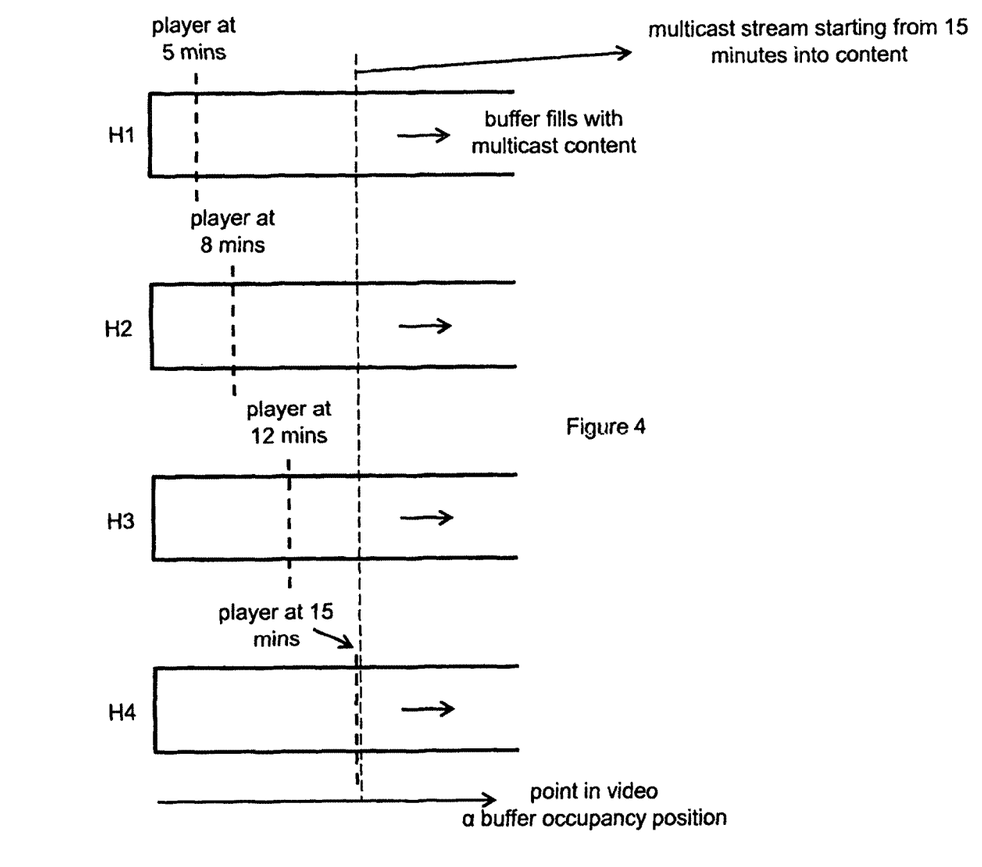
FIG. 4 is a schematic diagram of a method of triggering a time-staggered multicast content stream according to one embodiment.

Host H4 is furthest into the stream (i.e. it is the first host to have requested the content). Therefore a multicast stream is started at this point (i.e. 15 minutes into the content) and other 3 hosts H1, H2 and H3 are caught up to this point using unicast to fill their buffers simultaneously as the multicast stream is delivered and buffered for playback. The player moves further into the stream as it plays out the buffered packets and eventually arrives at 15 minutes into the video, where it will begin to play out content delivered by multicast. Similarly, for faster joining of all of the hosts to the stream being delivered to H4, a second, temporary multicast stream may be set up for example at the point at which host H3 has reached in the content, 12 minutes into the content. Hence minutes 12-15 may be delivered simultaneously to H1, H2 and H3 and this multicast stream may be pruned off by these hosts at 15 minutes, since the hosts will already have received minute 15 onwards from the stream being delivered to H4. Hence, multiple time-staggered multicast streams may be generated retrospectively.

Any number of multicast streams can be generated using one of the four decision methods described above. Alternatively, a skilled user could device an algorithm of when to trigger a new multicast stream after the first one, if at all.

Once it has been determined that multicast streams should be triggered described above and the time-interval between them has been calculated, the new stream is triggered and one method for doing this is described below.

The decision to trigger a new stream resides at the source or its proxy into the network (in particular if the source is inaccessible to the multicast enabler described here). Assuming that PIM-SM is in place as the multicast routing protocol, for a new multicast stream to be enabled, a Session Description File for this stream should be created at the source and its source-DR should register with a Rendezvous Point, RP, advertising its existence.

We assume that the source controls membership to its streams by obtaining group addresses from the existing address assignment server implementing a protocol such as the Multicast Address Dynamic Client Allocation Protocol, MADCAP, as well as advertising this to hosts using URIs for each of the multicast streams available. We assume for simplicity a 1-to-1 mapping between source stream and group address: all members of a single group might receive content from one time-staggered stream, the same members can be subscribed to another group address as well where they might receive another time-staggered stream of the same content. Alternatively, mapping a combination of a number of different content streams to a group address is also possible. Such dynamic address assignment may be implemented in conjunction with the present system However, since we only consider time-staggered versions of one piece of content, we assume a simple 1:1 assignment policy of a group address to a time-staggered content stream.

The source communicates its new URIs to a requesting host using a real time streaming protocol such as RTSP's Announce, Redirect, Get/Set_Parameter messages. Alternatively HTTP Streaming could be in place or any other proprietary stack of protocols. The host then resolves the new URI to the stream assigned by the source and sends its IGMP Join (Unsolicited Membership Report) to its Designated Router (DR). This request travels hop by hop towards the RP or the source using existing tree building methods, following which a multicast tree branch is created and the content is received downstream at the host.

Each of the above methods can be used as conditions to trigger a new multicast stream. Any or combinations of them can be used. They can also be used outside of the catch-up scenario, for example to handle fixed live data streaming and reduce unicast data replication when possible depending on the application. The method of triggering multiple multicast streams is a standalone entity that can perceived as a method behind content publishing, irrespective of how the content is subscribed to by the host group. The example described above demonstrates the advantage of deploying such intelligence in triggering multiple time-staggered multicast streams in a fixed stream scenario as well as in a flexible streaming scenario. In the case of flexible streaming, if the current time of play in the multicast content received is in the future, the host must buffer this content (if catch-up is applicable) and play it out as needed by the media player after it has caught up with using unicast to the point where multicast had started. An example outside the network domain for application of this system in purely the publish model (no catch-up) is to influence broadcast of flight entertainment. Another example within content broadcasting is to use this method to influence the lag time of a repeat show, e.g. Channel 4+1 could be Channel 4+20 minutes.

For the rest of the description below, irrespective of the method used from above, it is assumed that the outcome of the decision methodology is such that 3 streams have been triggered: S(T), S(T+N) and S(T+M) at times T, T+N and T+M, where M≥N and S(T) will be the furthest into the content at any one time. In this example, N and M are variables that represent the computational outcome of the decision algorithm for Interval(M).

The next step in the method described herein is to decide which host is to subscribe to which of the available multicast streams, following a request to receive a certain piece of on-demand content. Described below are factors and options that can be taken into account to make the assignment.

Note that the content publish model need not be as prescribed above for this method to be applicable. This is a standalone subscribe model system that can manage, for a given publish pattern, a subscription pattern for a host group, taking into account the various factors explained below. In the example described below, we assume that there are many time-staggered available streams for a single piece of content, generated using any set of criteria.

Figure 5A:
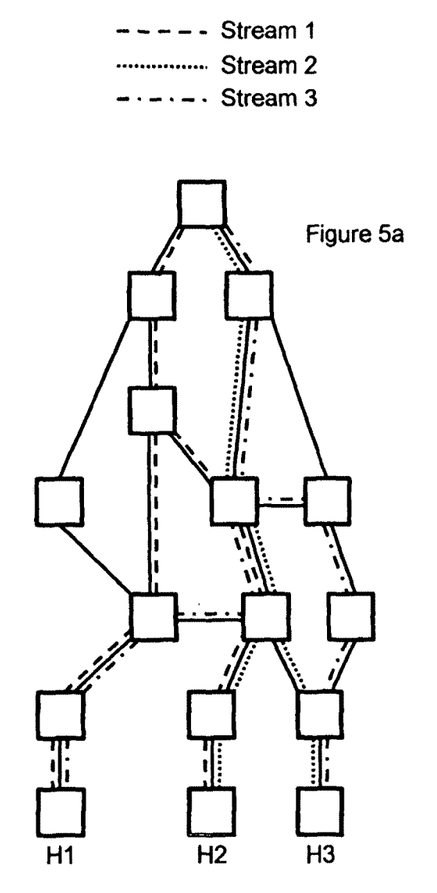
FIG. 5a illustrates a potential tree distribution topology according to one embodiment.
Figure 5B:
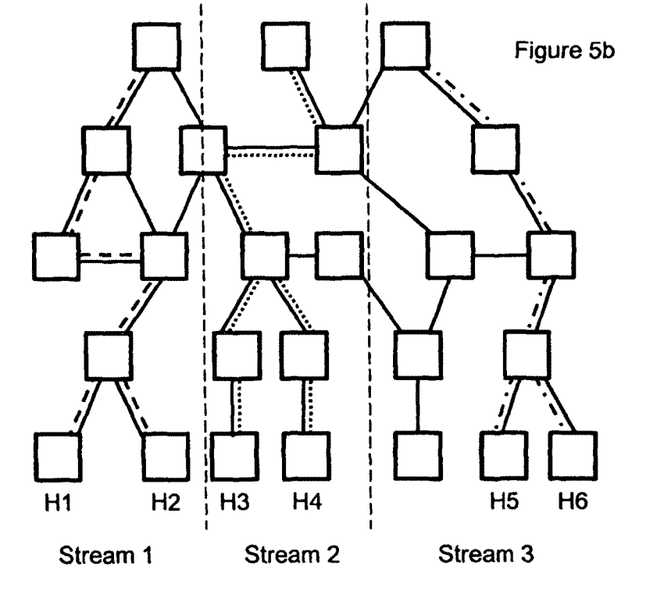
FIG. 5b illustrates a potential tree distribution topology according to another embodiment.

The network is divided into two types: one where the network is small enough such that the various multicast trees overlap or share common links and the other where the trees themselves are relatively sparse and potentially geographically distributed across the network. Examples of this are shown in FIG. 5. The last method set out below is best suited to the latter. The method that is used may also depend on the approach taken by the operator.

Note that, in some embodiments, the source maintains a table of the current time position into the video for each multicast stream as well as a mapping of which users are on which stream. This table can be implemented in some embodiments as set out in the table below, which shows a sample table maintained by a source for each available multicast stream.

| Multicast stream ID | Current position into content (hours) | Content consumers ID |
| --- | --- | --- |
| S1 | 1:15 | H1, H2, H5, H7, H10, H16 |
| S2 | 0:45 | H1, H3, H5, H6, H7, H8, H9, H10 |

Note that this is different to the traditional method of not needing to know all the hosts of a given group. Lack of this knowledge implies also a lack of knowledge of the current tree structure. This information can be collected if it is possible. If there is a method in the network of aggregating the membership in a way that a more generic tree structure is still derivable from the data, this can be used instead. The data could also be collected from IGMP snooping devices rather than host-DRs, if this is in place. Some of the following methods might not be possible in some networks if group membership information is not being collected.

Note that in the following scenarios, the source ensures that the host has both the link and buffer capacity to receive a number of streams and store them until play-out. If a single content stream is sent at a data rate of 2 Mbps and the last hop to the host can only support a maximum rate of 2.5 Mbps (where 500 Mbps is reserved for other traffic), then this host can only support one multicast channel that should provide the beginning of the video in order for rapid play-out unless a bandwidth sharing technique is imposed on the various streams transferred to this host and the packets that start off the video are prioritised to the host. If the link to the host has FTTC (Fiber-To-The-Curb) (≈50 Mbps downstream), the available data rate is much higher and there can be many data streams to this host. We assume in our descriptions that link capacity is not a limitation. However, the number of multicast sessions to which an application can trigger membership may be limited depending on availability of link capacity.

In a first method, the source attempts to deliver as much data simultaneously as possible to the host. It therefore requests the host to subscribe to as many streams as available, in this case S(T), S(T+N) and S(T+M). The source must verify that the host has sufficient buffer capacity to accommodate this so that by the time the media player has played-out until the point where the oldest stream (S(T)) starts, the last packets being delivered on S(T) can still be stored. Otherwise, the most recent packets of S(T) will be dropped before they are played-out since the buffer is full with packets that haven't yet been consumed and cannot store the newest packets of S(T). This will result in a gap in the media when this segment of S(T) must be consumed which must either be re-delivered or managed by upper layers during playback.

An advantage of this method may be that the network resources are consumed fully and released as soon as the download has finished. The host leaves all multicast groups as soon as the download is complete and playback can begin at any time. This approach is best suited for unrestricted link capacity and a buffer that can store longer than the duration of the video stream.

In a second method, the source can allocate hosts to groups according to which groups it wishes to retain, grow or shrink over time. For example, if the number of hosts consuming S(T) far exceeds the number of hosts consuming S(T+N), the source might decide to shrink away S(T+N) over time. Such behaviour arises due to a high rate of change of group membership. If S(T+N) is eventually terminated from flowing through the network, this data replication can be avoided and all hosts can obtain their content from S(T) with unicast catch-up for the missing portion for late joiners, i.e. users whose playback is closer to the beginning of the stream than S(T). This method can also be deployed after a check that the unicast catch-up streams will not last for a long duration in comparison with the total duration of the video. For example, if S(T) is such that it is currently delivering the last 15 minutes of a video that lasts 90 minutes, catching up a host that requests the video from the beginning for 75 minutes on unicast streaming before they can consume the last 15 minutes from the buffered multicast stream might not be worth the effort of sending Join/Prune messages to the tree delivering S(T) and setting up the new branch. These are trade-offs that may be made by the operator based on the scarcity of their network resources.

A third method approaches group assignment from the perspective of network reliability. For example, if the source is aware of a planned outage on one of the key links of S(T+M), it might choose to place a host on a different tree such as S(T+N) if the outage will not affect the latter. Alternatively, a more complex method of evaluating reliability is to compute the distribution of end-to-end performance metrics for host members of a given tree and use this to determine the stream that traverses a tree with the best likelihood of good network performance for a given host. This method does not necessarily take into account the position of the video itself and proportion of unicast to multicast segments in the video delivered but concentrates more on providing the user with a reliable experience with minimal packet loss, jitter and delay. This method can also be extended such that the source uses a predictive model to compute the performance of a tree or a branch (if the end-to-end pathway of the new host is known from the unicast protocol) and the optimal tree choice is made for a given host. Our earlier inventions describe methods and factors to take into account to evaluate the network performance of a given route for a given session requirement. We adapt this capability to compute an aggregate network performance metric per tree to decide on tree allocation for a host to receive the required content.

A fourth method is best suited in a network where the various groups are spread narrowly through clear portions of the network. The potential structure of such a network is illustrated in FIG. 5. Such networks arise because of the physical location of the hosts requesting the content. The hosts on the far left might be on S(T) whereas hosts on the middle tree might be receiving S(T+M) and the hosts on the right might receive S(T+N). Of course, such a stark demarcation of multicast trees might not occur in a real network but the possibility exists if each of the three portions of the network performs best for its local set of hosts but exhibits poor network delivery performance for hosts at a large number of hops from the tree. For example, the S(T) tree delivering to the host group on the left might have better performance than it having one tree branch flowing all the way downstream to a subnet of hosts on the right side of the network, which might be better served by S(T+N). This is especially exacerbated if the network supporting the tree for S(T+M) is suffering congestion due to other services. In such a scenario, the operator can decide to make the assumption that the number of hops to a host set is inversely proportional to the performance expected for the host set– the greater the number of hops, the worse the end-to-end performance. Such an approach also suits a network where the operator does not wish to have several tree branches spreading out through the network from a multicast tree, thus increasing data replication through parallel links and would instead prefer to have a narrower tree deeper into the network.

The host's geo-location can therefore be used to choose which multicast streams it is assigned to for the piece of content. In the simple example above, a host on the right is more likely to become a member of the group that receives S(T+N) since its RP and the corresponding tree are closest to it.

A technique to compute this is to compare the least number of hops from the host to the various trees that must be chosen from and to pick the tree(s) with the shortest path(s).

In a fifth method, the assignment of hosts to streams combines one or more of the above decision methods. For example, a source might assign a host to S(T+N) and unicast N minutes of video because its buffer capacity can only support N minutes of this video (assuming instant playback at the rate at which packets are delivered). It might also choose S(T+N) over S(T+M) even though the unicast portion of the video is minimised in the latter if it knows of impacting network performance issues in the tree delivering S(T+M) due to congestion. In another example, a host might be assigned a group closest to its geo-location in order to avoid traversing a portion of the network with congestion. A network operator can use any or all of the above considerations (reduce network load, group management strategies, network resource reliability or geo-location-based assignment) in any order of preference. If weighting factors are assigned to each of these factors, an aggregated metric can be computed for each tree per host combination and the tree(s) with the best metric value(s) can be chosen and communicated to the host to trigger membership.

Once the streams to which a host should subscribe have been selected, the source can communicate the list of URIs to be used by the host media player using unicast streaming protocol messages. While a multiple URI scheme is described herein, other methods might replace this to communicate the group address to the host, which it uses to become a member of this group to receive a single time-staggered multicast stream. Having the group addresses, the upper-layer-protocols pass a JoinHostGroup request to the IP layer. The IGMP membership is managed by the extended IP module for multicasting (upper-layer-protocol-to-IP interaction and IGMP extensions). IGMP is then used to send an IGMP Unsolicited Membership Report to the host's DR with the group addresses that it wishes to subscribe to. The host-DR then uses this information to construct the multicast tree branch to the host-DR for this group. The membership can be of (*, G) or (S, G) state and multicast routing is done as explained in RFC 4601 and RFC 2362.

The host also uses an RTSP/RTP/RTCP (or equivalent) session to receive the unicast stream to cover the content duration that it desires. These streaming protocols themselves, including methods to request a stream from a specific position, are prior art. The method of hosts gradually pruning off the multiple multicast streams as data replication occurs in the buffer has been explained above. The upper-layer-protocols send a LeaveHostGroup request to the IGMP module, which then sends a LeaveGroup request to the host-DR (or silently times out its membership). This results in a Join/Prune message being sent from the host-DR towards the multicast source or RP, clearing the relevant (*, G), (S, G) or (*,*, RP) states. Multicast data is no longer received for this group/source, i.e. the host stops receiving this stream of time-staggered content. Note that this leaving process is implemented by hosts subscribed to multiple time-staggered copies of the same video so that unnecessary network usage is avoided if the host already has the required packet sequence.

It is assumed that the host has the capability to receive multiple multicast streams/sessions simultaneously through one or more group memberships. It should also be able to handle the re-assembly of the packets from multiple streams to the correct video content in chronological order in its buffer for playback. i.e. a host application uses the position in the stream, marked on the packets, as well as the start time of a given multicast stream (S(T), S(T+N) etc.), to reassemble simultaneous inputs into the right order for the correct video (if there is more than one piece of content being download such as two different TV programmes, each downloaded using one or more time-staggered multicast streams). This relates to knowing the start positions in the buffer for the unicast stream as well as the multicast streams S(T), S(T+N), S(T+M) in FIG. 3 and rearranging the packets in the right order before playback.

Note also that it is possible in some embodiments to migrate existing multicast group subscribers to a different multicast group (for example from S(T+N) to S(T)) and trigger a catch-up (RTSP or similar) unicast session from the host for N minutes of video. Multicast group choice is not limited to the start of a host's request but can be performed during streaming as well. This may be useful, for example if a user wishes to pause or rewind a stream during playback or if reconfiguration of the multicast streams in the network is required.

An example of the operation of the system according to one embodiment is now set out in more detail, demonstrating the capability of the system to trigger multiple streams.

Assume that the content stream in this example has a data rate of 2 Mbps. Assume that 90% of the hosts of a known network of 20 elements have a buffer capacity to store 1 GB (just over 1 hour of this content). We assume that the content lasts 115 minutes.

The source now needs to decide whether or not, and how often, a new multicast stream is to be triggered.

The source optimises based on following criteria:
1. The total number of time-staggered multicast streams flowing through the network. For example, S(T), S(T+N) and S(T+M) will be 3 streams for the same content. Networks could operate with a maximum specified number of multicast streams for the same content so that data replication is minimised.
2. The minimum time that a user needs to download all the data for this video. This depends on how many streams are available as well as the downstream link capacity of the host and its buffer storage capacity.

The fixed parameters are:
1. The buffer and link capacity of the host
2. Data rate of the content The optimisation is such that while the least number of streams are generated for its users, each host can download the content as quickly as possible. For example, in order for a host to have the entire stream in a minute, we will need to create 115 multicast streams with a time difference of 1 minute between the playback points. The user will need a download capacity of 230 Mbps. The other extreme is that only 1 stream is generated, which then takes a user up to 115 minutes to download at a data rate of 2 Mbps (the link might have spare capacity, which goes unused). Also, if only one stream is available, if another host requests the same stream 100 minutes into the multicast stream, unicast catch up will last up to 100 minutes. It is evident that both these extremes are not desirable.

We have the following constraints:
Buffer capacity: 1 GB
Link capacity: 9 Mbps

Multicast stream limit: 10 Mbps (i.e. a content provider is not allowed to send more than 10 Mbps in multicast through this network at any one time, irrespective of the number of multicast streams. This means that this content can have a maximum of 5 streams at a data rate of 2 Mbps at any one time.)

This content must have a new stream at least once every hour. Else, the buffer capacity of the majority of hosts is insufficient. This means we need at least 2 streams. The link capacity of the hosts supports 4 streams with 1 Mbps reserved for other traffic. The network provider therefore decides to trigger a new stream every 30 minutes. Therefore, a new stream is triggered at the time of release of the content with playback positions 0, 30, 60 and 90 minutes—i.e. 4 streams start simultaneously at time 0, the first from the start, the second 30 minutes into the video, etc. To correlate with the description above, the stream starting at 90 minutes will be S(T), the stream starting at 60 minutes is S(T+N) and that which starts at 30 minutes into the video will be S(T+M). There is one more stream in this example starting at 0, which we call S(T+P) where P>M>N.

Assume that 10 requests, equally distributed, arrive for this content every hour. This means we get on average 1 request every 6 minutes. On average, we have not more than 5 hosts catching up on unicast and a unicast stream will not be longer than 30 minutes.

However, this assumption about equal distribution of arrival rates might not hold. Consider that we also have knowledge about the uptake of this content. For example, we know that there will be, on average, 4 requests every 5 minutes in the first hour after the content becomes available and 1 request every 12 minutes in the second hour. If we use our previous playback times for the 4 streams, we can have up to 8 unicast streams in a 30 minute interval.

Now we add another constraint: to have a small number of unicast streams at any one time.

To meet this constraint, we can use the user consumption information to skew the start time of the 4 streams to minimise the duration required on unicast for the later requests. If we trigger a new stream every 20 minutes (matching the distribution of hosts in the first and second hour (3:1)), we again will have not more than 5 unicast streams on average at any one time and the buffer capacity of 1 hour is still sufficient. The source triggers streams at time 0 with playback points at 0, 20, 40 and 60 minutes. It will not take more than 55 minutes for a new stream to begin since we can start a new stream once a stream has reached the end position at 115 minutes.

Note that this publish model to trigger multiple streams is stand-alone from a content publisher's perspective and need not be used for the subscribe model of assigning streams to hosts. In fact, it is possible that intelligence is deployed in triggering multiple streams and host membership to these streams is done using different policies entirely. Also, note that this method of triggering multiple streams can be used in a fixed streaming scenario as well (i.e. without catch-up). In this scenario, a host can only receive content from the point at which it subscribed to it (no rewind or fast-forwarding possible). In this case, the purpose of skewing the various stream start times will then be to exploit knowledge about the hosts to minimise the duration of the content that a host will miss on average when joining the multicast stream after it has already started.

The example method below demonstrates the assignment of one or more multicast streams to a host.

Assume a piece of content lasting 115 minutes at a data rate of 2 Mbps and the available streams are time-staggered by 15 minutes. There will be 8 simultaneously available streams for hosts to choose from. (There is no limit on the number of streams generated by the source.)

A host H1, requesting the content from the start, has a link capacity of 5 Mbps and a buffer capacity of 350 MB (roughly 20 minutes of storage for this content). This host cannot subscribe to an available multicast stream that is more than 15 minutes into the video. The request from H1 is made 12 minutes into the start of the most recent stream S' triggered by the source. Since it can only buffer 20 minutes, H1 will have to subscribe to S'. It must then catch up 12 minutes of content, play this back first to the user after which it can play back the content that was received through multicast. It must also teardown the unicast session (using RTSP Teardown, or similar) at this point to ensure that it does not continue to receive copies of the data after the first 12 minutes that it already has from multicast.

We have another host H2 that has a 10 Mbps link capacity and 1 GB buffer capacity (roughly 1 hour of this video). H2 requests for the content, from the beginning, after 10 minutes into the start of the most recent stream (S'). Assume that the objective of the network provider is to give the user the content as quickly as possible, subject to its link and buffer capacities. Therefore, it requests H2 to subscribe to S' and the streams that started 30 (S30), 60 (S60) and 90 (S90) minutes before S'. This means that the host will receive all the content in a 30 minute period. It will also need a unicast session from the source for the first 10 minutes of the content. Link utilisation will be 10 Mbps for the first 10 minutes and then fall to 8 Mbps for 15 minutes and 6 Mbps for the last 5 minutes of streaming. Any other combination of streams results in a longer download duration.

Now we give an example where the assignment of multiple streams is made based on the network performance of the various multicast trees carrying the streams. We assume that each tree only forwards one time-staggered stream but this can be extended in a real-life scenario. Assume that there are currently 3 multicast trees carrying one time-staggered stream of the video each. When a host H3 requests for the unicast URI, the source must reply with the URI that points the host to the respective tree, chosen for it by the source.

The source computes a performance score for each multicast tree. There are a number of metrics that it can use to compute this. For example, rate of change of Explicit Congestion Notifications, ECN notifications, average packet loss, average jitter, average throughput over all the links, average number of hops to the RP, number of hops to the nearest multicast tree member from the requesting host, average end-to-end delay etc. All the metrics that are taken as averages here could also be distributions across the network—this increases complexity of the scoring below but follows the same principle. There can also be derived metrics from the routers that denote their health. For example, if the difference between the number of egress packets and the number of ingress packets increases, this means that the router is unable to push out packets at the rate at which it receives them—this value, as a percentage of the total number of incoming packets per class of service, could be used as a measure of the router's health. Some of these metrics can be predictive taking into account, for example methods of detecting QoS degradation. There can be other metrics that take into account the shape of the tree itself and rate some tree shapes are better than others. The actual set of metrics used to compute the 'tree health' score can be application and operator-dependent and our list above is only an indicative list.

For each of the above metric, we have a number of quality classes that will be used to match the metric received from the network with an indication of how 'good' it is. For example, the maximum acceptable packet loss for a given class of service could be 0.1%. Therefore, a gradient from 0% loss to 0.1% loss, with step sizes of 0.02% loss, results in 5 quality classes. The incoming metric is matched with this scale and a quality value is assigned to it. The number of classes apportioned to a given metric reflects the importance of this metric to the overall score (seen below). We perform this step for all the metrics that we use to compute the tree health score.

For this example, we compute this score from packet loss, delay and jitter using the following quality classes (the upper bound of a class does not belong to the class):

Packet loss (acceptable SLA: 0.1% max):
5: 0-0.02%; 4: 0.02-0.04%; 3: 0.04-0.06%; 2: 0.06-0.08%; 1: 0.08-0.1%; 0 otherwise Jitter (acceptable SLA: 2 ms max):
2: 0-1 ms; 1: 1-2 ms; 0 otherwise Delay (acceptable SLA: 20 ms max):
5: 0-4 ms; 4: 4-8 ms; 3: 8-12 ms; 2: 12-16 ms; 1:16-20 ms; 0 otherwise Assume that measurements of average loss, jitter and delay for the 3 available trees (calling them T1, T2, T3) are:
T1: 0.05%, 1.5 ms, 15 ms
T2: 0.08%, 2.0 ms, 18 ms
T3: 0.03%, 1.5 ms, 13 ms Once the quality class values are obtained from the scorecards, the sum of all the quality values can give us a score for overall tree health.

Using the above scorecard, we obtain scores of 6 for T1, 2 for T2 and 7 for T3.

The way in which we have constructed our classes mean that the tree with the highest score is the best suited for this traffic. Our tree choice will be T3 for host H3. Note that T3 would correspond to a specific time-staggered stream. With this method of selection, the missing period from the time of membership to the multicast stream on T3 must be unicast to the host H3.

This example would also work if the key performance indicator relates to group membership instead of health of a multicast tree. Each source can have a strategy of group management, reflected by the group score (similar to health score here), which can then be used to grow or shrink the size and alter the shape of a multicast tree in a desired way. The source can also migrate existing group members to an alternative group depending on the score obtained for each existing group.

What is claimed is:

1. A method of delivering content from a source to at least one destination in a content delivery network, the method comprising:
   receiving a request for delivery of a piece of content to the destination;
   receiving information relating to a capability of the destination; and
   determining whether the content should be delivered in a multiple multicast time-shifted content delivery mode, the mode comprising delivering the piece of content using a plurality of multicast streams, the plurality of multicast streams each delivering the content with a relative time-shift between corresponding portions of the content;
   wherein the determination is based on at least one of:
      a measure of the number of requests for the content in a preceding time period;
      a model of predicted requests for the content in a subsequent time period;
      a determination of the geographical or topological distribution of the existing or expected destinations in the network;
      the topological or geographical position of the requesting destination in the content delivery network compared to the position of other destinations already receiving the content; and/or
      a measure of the network capacity or availability between the source and the at least one destination; and
   wherein the at least one destination comprises a plurality of destinations and the capability comprises the buffer capacity of the destination having the smallest buffer capacity, the mean buffer capacity of the destinations or the modal buffer capacity of the destinations.

2. The method according to claim 1 wherein the determination is based on a combination of factors.

3. The method according to claim 1 wherein the information relating to the capability of the destination comprises an indication of whether the destination is able to receive multiple multicast streams.

4. The method according to claim 1 wherein the capability of the destination comprises the buffer capacity of the destination and/or a determination of the number of streams that can be simultaneously received by the destination.

5. The method according to claim 1 wherein the model of predicted requests determines the expected number of requests or expected rate of requests for the content over a subsequent time period.

6. The method according to claim 1 wherein the model of predicted requests determines the expected geographical or topological distribution of requesting destinations over a subsequent time period.

7. The method according to claim 1 wherein the content is delivered using a plurality of time-delayed multicast streams if the destination requesting the content is capable of receiving a plurality of time-delayed multicast streams and at least one, optionally both, of the following conditions is fulfilled:
   the model predicts at least one further request for the content in a predetermined period; and
   the content is being delivered to a least one other destination that is topological or geographically proximate to the requesting destination.

8. A system of delivering content from a source to at least one destination in a content delivery network, the system comprising a computer system and being configured at least to:
   receive a request for delivery of a piece of content to the destination;
   receive information relating to a capability of the destination; and
   determine whether the content should be delivered in a multiple multicast time-shifted content delivery mode, the mode comprising delivering the piece of content using a plurality of multicast streams, the plurality of multicast streams each delivering the content with a relative time-shift between corresponding portions of the content;
   wherein the determination is based on at least one of:
      a measure of the number of requests for the content in a preceding time period;
      a model of predicted requests for the content in a subsequent time period;
      a determination of the geographical or topological distribution of the existing or expected destinations in the network;
      the topological or geographical position of the requesting destination in the content delivery network compared to the position of other destinations already receiving the content; and/or
      a measure of the network capacity or availability between the source and the at least one destination; and
   wherein the at least one destination comprises a plurality of destinations and the capability comprises the buffer capacity of the destination having the smallest buffer capacity, the mean buffer capacity of the destinations or the modal buffer capacity of the destinations.

9. The system according to claim 8 wherein the determination is based on a combination of factors.

10. The system according to claim 8 wherein the information relating to the capability of the destination comprises an indication of whether the destination is able to receive multiple multicast streams.

11. The system according to claim 8 wherein the capability of the destination comprises the buffer capacity of the destination and/or a determination of the number of streams that can be simultaneously received by the destination.

12. The system according to claim 8 wherein the model of predicted requests determines the expected number of requests or expected rate of requests for the content over a subsequent time period.

13. The system according to claim 8 wherein the model of predicted requests determines the expected geographical or topological distribution of requesting destinations over a subsequent time period.

14. The system according to claim 8 wherein the content is delivered using a plurality of time-delayed multicast streams if the destination requesting the content is capable of receiving a plurality of time-delayed multicast streams and at least one, optionally both, of the following conditions is fulfilled:
   the model predicts at least one further request for the content in a predetermined period; and
   the content is being delivered to a least one other destination that is topological or geographically proximate to the requesting destination.

* * * * *